(12) United States Patent
Swales

(10) Patent No.: US 6,599,214 B2
(45) Date of Patent: Jul. 29, 2003

(54) APPROACH TO INTEGRATING A STARTER-GENERATOR WITH AN AUTOMATIC TRANSMISSION

(75) Inventor: Shawn Harold Swales, Canton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/022,121

(22) Filed: Dec. 14, 2001

(65) Prior Publication Data

US 2002/0111239 A1 Aug. 15, 2002

Related U.S. Application Data

(60) Provisional application No. 60/267,679, filed on Feb. 9, 2001.

(51) Int. Cl.$^7$ ............................................... F16H 47/08
(52) U.S. Cl. ............................ 475/35; 475/5; 475/47; 180/65.2
(58) Field of Search ......................... 475/35, 4, 5, 39, 475/153, 41, 47; 180/65.1, 65.2

(56) References Cited

U.S. PATENT DOCUMENTS

| | | | |
|---|---|---|---|
| 4,454,786 A | 6/1984 | Stockton | 74/688 |
| 4,542,722 A | 9/1985 | Reynolds | 123/179 E |
| 4,743,776 A * | 5/1988 | Baehler et al. | 290/22 |
| 5,103,127 A | 4/1992 | Peter | 310/113 |
| 5,513,719 A * | 5/1996 | Moroto et al. | 180/65.4 |
| 5,558,173 A | 9/1996 | Sherman | 180/53.8 |
| 5,558,175 A | 9/1996 | Sherman | 180/65.2 |
| 5,789,823 A | 8/1998 | Sherman | 290/47 |
| 5,801,499 A | 9/1998 | Tsuzuki et al. | 318/141 |
| 6,048,288 A | 4/2000 | Tsuji et al. | 477/5 |
| 6,092,985 A * | 7/2000 | Winkam | 415/122.1 |
| 6,340,339 B1 * | 1/2002 | Tabata et al. | 180/65.2 |

* cited by examiner

*Primary Examiner*—Sherry Estremsky
*Assistant Examiner*—Tisha D. Lewis
(74) *Attorney, Agent, or Firm*—Brinks, Hofer, Gilson & Lione

(57) ABSTRACT

A transmission having a starter/generator that is not mounted on the engine crankshaft is provided. The starter/generator is drivingly or directly connected to a transmission pump, and can selectively engage a torque converter and/or an internal combustion engine. The invention allows for efficient disengagement of the engine when the vehicle is stopped, and reengagement upon subsequent torque demand.

19 Claims, 2 Drawing Sheets

APPROACH TO INTEGRATING A STARTER-GENERATOR WITH AN AUTOMATIC TRANSMISSION

REFERENCE TO PREVIOUS APPLICATION

This application claims the benefit of U.S. Provisional Application No. 60/267,679 filed Feb. 9, 2001.

FIELD OF THE INVENTION

The present invention relates to a power train for a motor vehicle. More particularly, the invention relates to a power train that allows a starter/generator to drive a transmission pump and to selectively engage an internal combustion engine.

BACKGROUND OF THE INVENTION

Vehicle transmissions include an internal combustion engine, a starter/generator, and a transmission input. Incorporating a starter/generator into a transmission presents several issues. For example, crankshaft-mounted starter/generators add a large mass, i.e., the mass of the rotor, to the crankshaft. This adds load to the crankshaft bearings, and can exacerbate crankshaft deformation and stress due to dynamic loading. Ultimately, deformation of the crankshaft can make it difficult to maintain the small, uniform air gap desirable for the starter/generator.

SUMMARY OF THE INVENTION

The present invention provides a power train having a starter/generator that is not mounted on the crankshaft. Furthermore, the starter/generator is able to directly drive a transmission pump, and can selectively engage a torque converter and/or an internal combustion engine.

Briefly, a power train in accordance with the present invention comprises an internal combustion engine, a starter/generator that has a rotor, a torque converter, a transmission pump directly connected to the rotor, a selectively engageable clutch disposed between the starter/generator and internal combustion engine, and a transmission input directly connected to the output turbine of the torque converter.

BRIEF DESCRIPTION OF THE DRAWINGS

FIG. 1 is a schematic representation of a power train in accordance with a first preferred embodiment of the present invention, while

DETAILED DESCRIPITION OF THE PREFERRED EMBODIMENTS OF THE INVENTION

The following description of the preferred embodiments of the invention provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
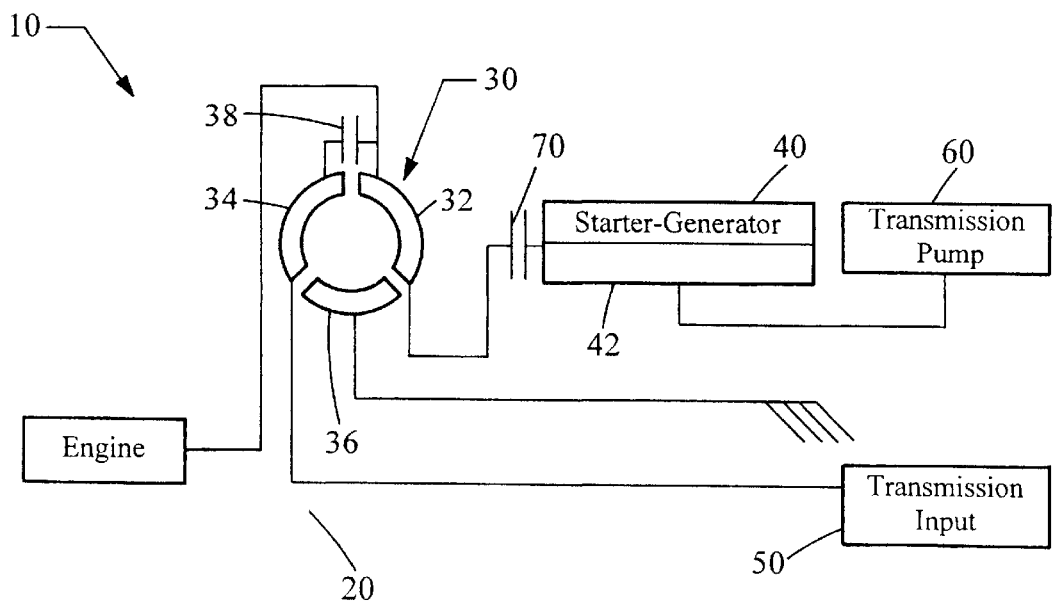

FIGS. 1 illustrates a schematic representation of a first preferred embodiment of the present invention. In this embodiment, a power train 10 includes an internal combustion engine 20, a torque converter 30, a starter/generator 40, a transmission input 50, and a transmission pump 60. A clutch 70 is disposed between the engine and the starter/generator. The engine is well known in the art, and will not be described in detail herein.

The torque converter 30 includes an input impeller 32, an output turbine 34, and a stator 36. The torque converter 30 includes a first clutch 38. In a first preferred embodiment, illustrated in FIG. 1, the input impeller 32 is drivingly or directly connected to the engine 20. In this embodiment, there is no clutch disposed between the engine and the impeller. A selectively engageable second clutch 70 is disposed between a rotor 42 of the starter/generator and the impeller 32.

The transmission input 50 preferably comprises a multi-speed transmission, but any suitable vehicle transmission can be utilized. The transmission pump 60 preferably comprises a hydraulic pump.

Figure 1A:
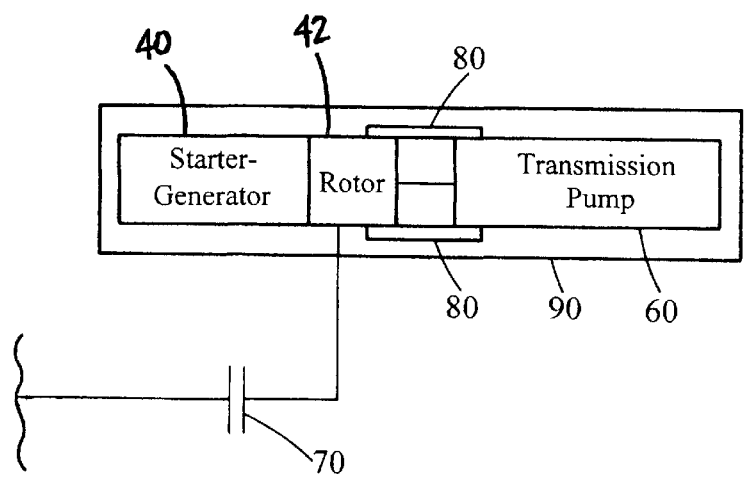
FIGS. 1a and 1b are schematic representations of variations of the power train shown in FIG. 1.
Figure 1B:
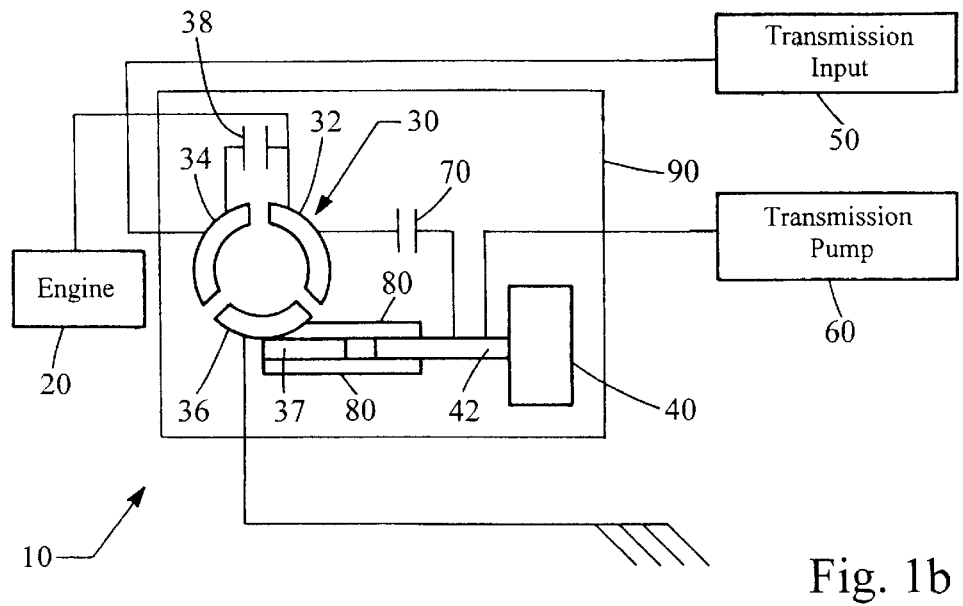

Thus, the arrangement of the first preferred embodiment allows the engine 20 to drive the impeller 32 of the torque converter 30 directly. The rotor 42 of the starter/generator 40 and the transmission pump 60, however, are driven through the second clutch 70. This arrangement allows for an inertia start, and places the starter/generator 40 on the transmission side of the torque converter 30. This allows the rotor 42 to run on bearings 80 (FIG. 1a) on the transmission pump cover or the shaft 37 (FIG. 1b) of the stator 36, which eliminates the need to place the rotor 42 on a crankshaft. Preferably, the housing of the pump 60 is integrally made with the housing of the starter/generator 40, as shown by the integrated housing 90 of FIG. 1a. Alternatively, the pump housing can be made integral with the torque converter housing, as shown by the integrated housing of FIG. 1b.

In this embodiment, the starter/generator 40 can directly drive the transmission pump 60 without having to also supply torque to the impeller 32 or engine 20. This is accomplished by disengaging the second clutch 70. This allows the engine 20 to be turned off when the vehicle is stopped while the starter/generator continues to power the transmission pump. The engine can be quickly restarted upon torque demand, using energy stored in the rotating starter/generator 40 to supply a portion of the engine cranking torque.

Figure 2:
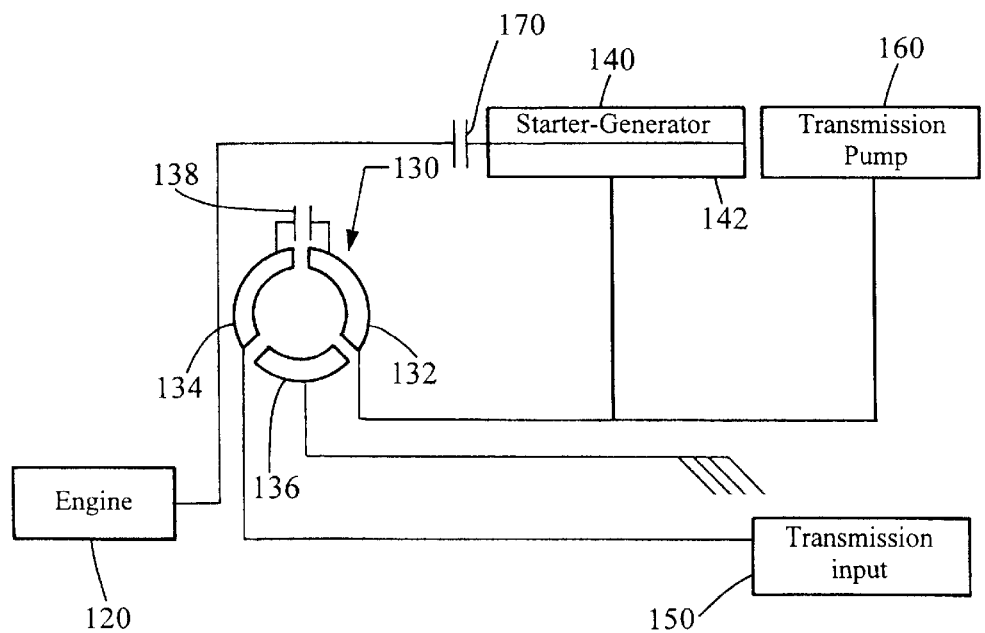
FIG. 2 is a schematic representation of a power train in accordance with a second preferred embodiment of the present invention.

FIG. 2 illustrates a second preferred embodiment of the power train of the present invention. Like references in FIG. 2 refer to similar components and/or features illustrated in FIG. 1. In this embodiment, the engine 120 is not directly connected to the input impeller 132 of the torque converter 130. Rather, the engine 120 is connected to the rotor 142 of the starter/generator 140. The selectively engageable clutch 170 is disposed between the engine 120 and the rotor 142. Preferably, the rotor 142 is directly connected to the transmission pump 160 and the impeller 132.

This arrangement allows the engine 120 to be advantageously disconnected from the transmission input 150 during periods of regenerative braking. Clutch 138 can be engaged during regenerative braking to provide a direct connection from the transmission input 150 to the starter/generator 140 for improved energy capture. When the engine 120 is disconnected and the vehicle stopped, the starter/generator 140 can drive the transmission pump 160 as in FIG. 1. In this embodiment, however, this occurs at a lower efficiency than in the first preferred embodiment because the starter/generator 140 also must drive the impeller 132.

The foregoing disclosure includes the best mode devised by the inventors for practicing the invention. It is apparent, however, that several variations in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations. As such, the present invention should be limited only by the spirit and scope of the following claims.

I claim:

1. A power train for a motor vehicle, comprising:
   an internal combustion engine;
   a starter/generator having a rotor;
   a torque converter having an input impeller, an output turbine, and a stator having a housing;
   a transmission pump having a cover and being directly connected to the rotor such that the pump can receive power directly from the rotor;
   a transmission input directly connected to the output turbine of the torque converter;
   a selectively engageable clutch disposed between the starter/generator and the internal combustion engine;
   the internal combustion engine being operatively connected to the input impeller of the torque converter; and
   the rotor of the starter/generator being operatively connected to the input impeller of the torque converter.

2. A power train in accordance with claim 1, wherein the rotor is disposed between the transmission pump and the torque converter.

3. A power train in accordance with claim 1, wherein the internal combustion engine is in direct connection with the impeller input of the torque converter and the clutch is disposed between the starter/generator and the impeller.

4. A power train in accordance with claim 1, wherein the rotor is in further direct connection with the input impeller of the torque converter.

5. A power train in accordance with claim 1, wherein the internal combustion engine is directly connected to the input impeller of the torque converter.

6. A power train in accordance with claim 1, wherein the internal combustion engine is directly connected to the rotor of the starter/generator via the selectively engageable clutch.

7. A power train in accordance with claim 1, wherein the internal combustion engine is operatively connected to the input impeller through the rotor of the starter/generator and the selectively engageable clutch.

8. A power train in accordance with claim 1, further comprising a clutch disposed between the input impeller and the output turbine of the torque converter.

9. A power train in accordance with claim 2, wherein the rotor is disposed on bearings of the cover of the pump.

10. A power train in accordance with claim 2, wherein the rotor is further disposed on bearings of a shaft of the torque converter.

11. A power train in accordance with claim 2, wherein the cover of the transmission pump is integrally formed with a housing of the starter/generator.

12. A power train in accordance with claim 5, wherein the selectively engageable clutch is disposed between the starter/generator and the input impeller of the torque converter.

13. A power train in accordance with claim 8, wherein the clutch is disposed between the starter/generator and the input impeller of the torque converter.

14. A power train for a motor vehicle, comprising:
    an internal combustion engine;
    a torque converter having an input impeller, an output turbine, and a stator;
    a transmission pump;
    a transmission input directly connected to the output turbine of the torque converter;
    a starter/generator operatively connected to both the transmission pump and the input impeller;
    the internal combustion engine being operatively connected to the input impeller of the torque converter; and
    a clutch disposed between the starter/generator and the internal combustion engine for providing selective driving of the input impeller by the starter/generator and the internal combustion engine.

15. A power train in accordance with claim 8, wherein the starter/generator includes a rotor directly connected to the input impeller of the torque converter.

16. A power train in accordance with claim 14, wherein the internal combustion engine is directly connected to the input impeller of the torque converter.

17. A power train in accordance with claim 14, wherein the starter/generator is directly connected to the input impeller of the torque converter.

18. A power train in accordance with claim 14, wherein the internal combustion engine is directly connected to the starter/generator via the clutch.

19. A power train in accordance with claim 14, wherein the internal combustion engine is operatively connected to the input impeller through the starter/generator and the clutch.

* * * * *

UNITED STATES PATENT AND TRADEMARK OFFICE
CERTIFICATE OF CORRECTION

PATENT NO. : 6,599,214 B2
DATED : July 29, 2003
INVENTOR(S) : Shawn H. Swales

It is certified that error appears in the above-identified patent and that said Letters Patent is hereby corrected as shown below:

<u>Column 4,</u>
Line 34, after "with" delete "claim 8," and substitute -- claim 14, -- in its place.

Signed and Sealed this

Fourth Day of May, 2004

JON W. DUDAS
*Acting Director of the United States Patent and Trademark Office*